(12) United States Patent
Yamada

(10) Patent No.: US 8,957,950 B2
(45) Date of Patent: Feb. 17, 2015

(54) ELECTRONIC APPARATUS AND IMAGE OUTPUT METHOD

(75) Inventor: Masahiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 582 days.

(21) Appl. No.: 13/358,780

(22) Filed: Jan. 26, 2012

(65) Prior Publication Data

US 2012/0120210 A1 May 17, 2012

Related U.S. Application Data

(63) Continuation of application No. 13/040,086, filed on Mar. 3, 2011, now abandoned.

(30) Foreign Application Priority Data

Mar. 30, 2010 (JP) .................................. 2010-079838

(51) Int. Cl.
*H04N 13/04* (2006.01)
*H04N 13/00* (2006.01)

(52) U.S. Cl.
CPC ....... *H04N 13/0066* (2013.01); *H04N 13/0022* (2013.01); *H04N 13/007* (2013.01)
USPC .......................................................... 348/54

(58) Field of Classification Search
CPC .................................................. G02B 27/2214
USPC ..................................................... 348/47, 54
See application file for complete search history.

(56) References Cited

U.S. PATENT DOCUMENTS 7,561,788 B2 * 7/2009 Kobayashi et al. ............. 396/88
7,572,009 B2 * 8/2009 Suzuki ........................... 351/206
7,596,259 B2 9/2009 Tooyama et al.

(Continued)

FOREIGN PATENT DOCUMENTS

JP 08-317429 11/1996
JP 2000-078615 3/2000

(Continued)

OTHER PUBLICATIONS

Japanese Office Action, Notification of Reasons for Refusal for Application No. 2011-174015, Mailed Oct. 18, 2011, with English Translation, in 5 pages.
Decision to Grant a Patent mailed by the Japan Patent Office on Jul. 19, 2011 in corresponding Japanese app. No. 2010-079838 in 4 pages.

*Primary Examiner* — Sath V Perungavoor
*Assistant Examiner* — James Pontius
(74) *Attorney, Agent, or Firm* — Knobbe, Martens, Olson & Bear LLP

(57) ABSTRACT

According to one embodiment, an electric apparatus includes a receiving module, an expanding module, and an output module. The receiving module is configured to receive a motion picture including a first image and a second image having a parallax therebetween. The expanding module is configured to expand the first image and the second image at least in a horizontal direction. The output module is configured to output data of a third image corresponding to a first region of the expanded first image and a fourth image corresponding to a second region of the expanded second image. The first region comprises the same size as the first image and does not include a first horizontal end portion of the extended first image. The second region comprises the same size as the second image and does not include a second horizontal end portion of the extended second image.

20 Claims, 9 Drawing Sheets

(56) References Cited

U.S. PATENT DOCUMENTS

| | | |
|---|---|---|
| 7,680,322 B2 | 3/2010 | Tooyama et al. |
| 8,035,683 B2 | 10/2011 | Kitaura et al. |
| 2007/0058961 A1* | 3/2007 | Kobayashi et al. ............ 396/88 |
| 2008/0151044 A1* | 6/2008 | Sawachi ........................ 348/51 |
| 2008/0152214 A1* | 6/2008 | Sawachi ...................... 382/154 |
| 2008/0158346 A1* | 7/2008 | Okamoto et al. ............. 348/47 |
| 2009/0041338 A1* | 2/2009 | Sawachi ....................... 382/154 |
| 2009/0263007 A1* | 10/2009 | Kitaura et al. ............... 382/154 |
| 2011/0018969 A1* | 1/2011 | Tanaka ......................... 348/47 |
| 2011/0122232 A1* | 5/2011 | Hoshino ....................... 348/47 |
| 2011/0235066 A1* | 9/2011 | Sakuragi ...................... 358/1.6 |

FOREIGN PATENT DOCUMENTS

| | | |
|---|---|---|
| JP | 2002-125245 | 4/2002 |
| JP | 2004-343290 | 12/2004 |
| JP | 2005-073013 | 3/2005 |
| JP | 2005-073049 | 3/2005 |
| JP | 2006-208923 | 8/2006 |
| WO | WO 2004-082297 | 9/2004 |

* cited by examiner

US 8,957,950 B2

ELECTRONIC APPARATUS AND IMAGE OUTPUT METHOD

CROSS REFERENCE TO RELATED APPLICATION(S)

This application is a continuation of U.S. patent application Ser. No. 13/040,086 filed on Mar. 3, 2011, which is based upon and claims the benefit of priority from Japanese Patent Application No. 2010-079838 filed on Mar. 30, 2010, the entire contents of both which are incorporated herein by reference.

BACKGROUND

1. Field

Embodiments described herein relate generally to an electronic apparatus and an image output method.

2. Description of the Related Art

With the recent technological development, electronic apparatus have been proposed which can output a motion picture that can be recognized as a 3D motion picture by the user (hereinafter referred to as a 3D-viewable motion picture).

One common image presenting method that is used when such an electronic apparatus presents a 3D motion picture to the user is as follows. Only the right eye and only the left eye of the user are caused to see right-eye images and left-eye images having a parallax, respectively, whereby the user can recognize the displayed motion picture three-dimensionally.

When an electronic apparatus is to present a 3D motion picture to the user, there may occur a case that a set of images to be seen by the right eye and a set of images to be seen by the left eye are not presented to the respective eyes properly because of such factors as the distance between the user and the display screen and the size of the display screen and, as a result, the user cannot properly recognize the displayed motion picture as a 3D motion picture.

For example, where a 3D-viewable motion picture is displayed on a large display screen, the parallax between right-eye images and left-eye images may become so large that the user cannot properly recognize it three-dimensionally.

BRIEF DESCRIPTION OF THE SEVERAL VIEWS OF THE DRAWINGS

A general configuration that implements the various features of the invention will be described with reference to the drawings. The drawings and the associated descriptions are provided to illustrate embodiments of the invention and not to limit the scope of the invention.

DETAILED DESCRIPTION

In general, according to one embodiment, an electronic apparatus includes a receiving module, an expanding module and an output module. The receiving module is configured to receive a motion picture including a first image and a second image having a parallax therebetween. The expanding module is configured to expand the first image and the second image at least in a horizontal direction to obtain an expanded first image and an expanded second image. The output module is configured to output data of a third image corresponding to a first region of the expanded first image and a fourth image corresponding to a second region of the expanded second image. The first region comprises the same size as the first image and does not include a first horizontal end portion of the extended first image. The second region comprises the same size as the second image and does not include a second horizontal end portion of the extended second image. The first horizontal end portion and the second horizontal end portion are located on opposite sides in the motion picture.

Exemplary embodiments will be hereinafter described with reference to the drawings.

(First Embodiment)

A first embodiment of the invention will be described below.

Figure 1:
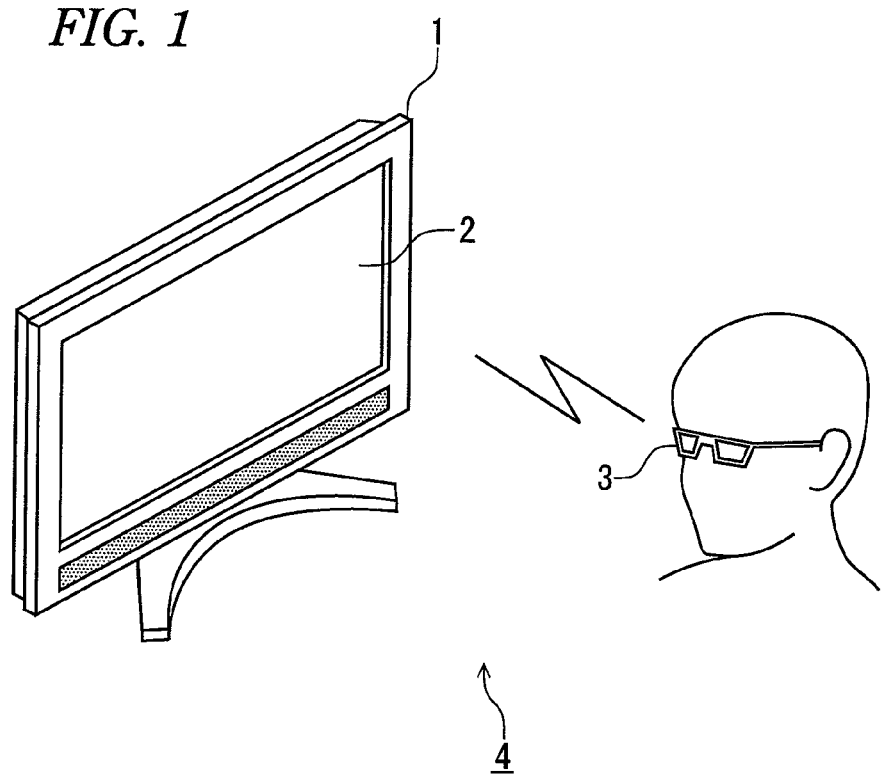
FIG. 1 is an exemplary conceptual view showing a general appearance of a motion picture display system according to a first embodiment.

FIG. 1 shows a general appearance of a motion picture display system 4 according to the first embodiment. As shown in FIG. 1, the motion picture display system 4 is composed of a digital TV receiver (DTV) 1 and shutter glasses 3. The DTV 1 has a display screen 2.

The DTV 1 is an example electronic apparatus according to the embodiment. The DTV 1 has a function of receiving motion picture data that is carried by broadcast waves or supplied from another motion picture playback apparatus and displaying a motion picture on the display screen 2 based on the received motion picture data. The DTV 1 can selectively display a 2D motion picture which the user recognizes as a 2D motion picture and a 3D-viewable motion picture which the user can recognize three-dimensionally.

In displaying a 3D-viewable motion picture, the DTV 1 alternately displays left-eye images and right-eye images having a parallax on the display screen 2 and transmits the shutter glasses 3 an opening/closing signal for switching the light transmission/stop of liquid crystal shutters in synchronism with the display, whereby the user who wears the shutter glasses 2 can see a 3D motion picture. Although the embodiment is directed to the DTV 1 which is an example electronic apparatus, the invention is not limited to such a case. Any of various electronic apparatus such as a set-top box (STB) and a personal computer (PC) can be employed.

The shutter glasses 3 are equipped with a left-eye lens and a right-eye lens each of which is provided with a liquid crystal shutter capable of stopping light. The combination of the lens and the liquid crystal shutter will be referred to as a lens unit below. Although in the embodiment the shutter glasses 3 are provided with the lenses (left-eye lens and right-eye lens), the invention is not limited to such a case. For example, the shutter glasses 3 may be provided with flat plates made of a transparent material such as glass, rather than the lenses. The shutter glasses 3 provide the user with a 3D motion picture in such a manner that the liquid crystal shutters of the left-eye lens unit and the right-eye lens unit are opened or closed at different time points based on a shutter opening/closing signal received from the DTV 1. For example, when a left-eye image is displayed on the DTV 1, the shutter glasses 3 allow only the left eye of the user to see the left-eye image by closing the liquid crystal shutter of the right-eye lens unit (rendering it opaque) and opening the liquid crystal shutter of the left-eye lens unit (rendering it transparent) based on a shutter opening/closing signal received from the DTV 1. When a right-eye image is displayed on the DTV 1, the shutter glasses 3 allow only the right eye of the user to see the right-eye image by closing the liquid crystal shutter of the left-eye lens unit (rendering it opaque) and opening the liquid crystal shutter of the right-eye lens unit (rendering it transparent) based on the shutter opening/closing signal. With this operation, the user can recognize, three-dimensionally, the motion picture being displayed.

The principle of 3D vision will be described below in more detail. A human usually sees an object with his or her left eye and right eye which are located at different positions, and a parallax exists between images taken by the left eye and the right eye. The human can recognize the object as a 3D object by combining the images taken by the left eye and the right eye and having the parallax in his or her brains. Therefore, a user is allowed to recognize a motion picture three-dimensionally by causing the user to see a left-eye image and a right-eye image having a parallax through the respective eyes. In this manner, the shutter glasses 3 cause the user to recognize, as a 3D motion picture, a motion picture displayed by the DTV 1.

The motion picture display system 4 is composed of the DTV 1 and the shutter glasses 3. And the user who views a 3D-viewable motion picture being displayed on the DTV 1 while wearing the shutter glasses 3 can recognize it three-dimensionally.

Next, situation that may arise when the DTV 1 displays a 3D-viewable motion picture will be described.

Figure 2A:
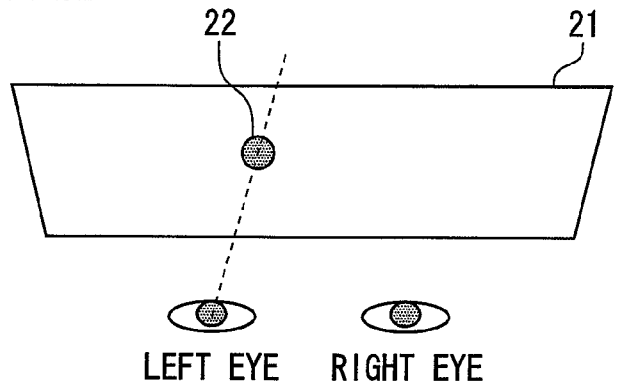
FIGS. 2A-2C are exemplary conceptual views showing a manner of viewing of the user when a 3D-viewable motion picture is displayed.
Figure 2B:
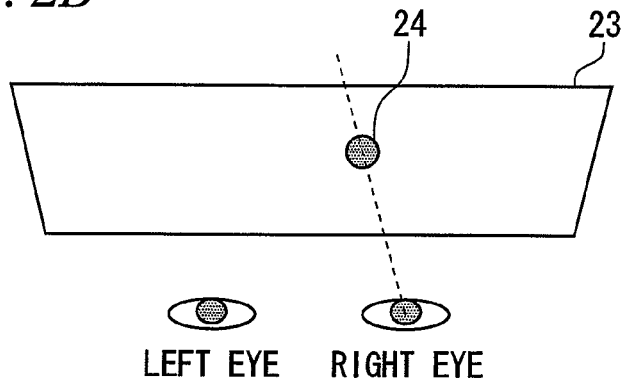
Figure 2C:
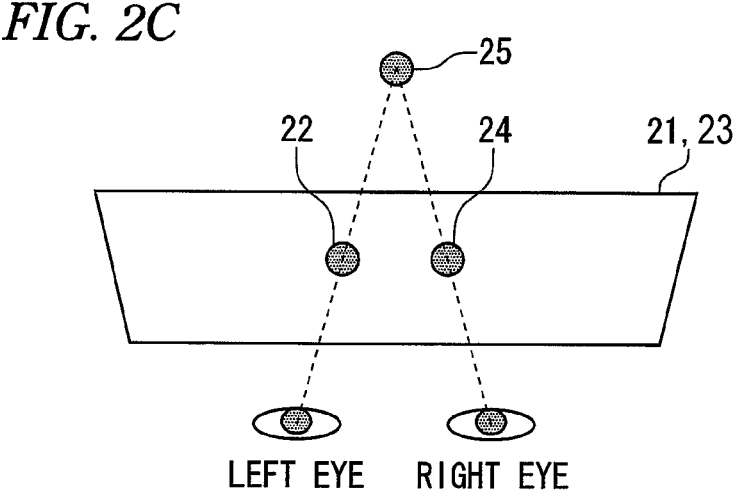

FIGS. 2A-2C are conceptual views showing an example manner of viewing of the user when a 3D-viewable motion picture is displayed.

FIG. 2A shows a line of sight of the user in a state that his or her left eye is seeing a left-eye image 21. While the DTV 1 displays the left-eye image 21, the shutter glasses 3 render the left-eye lens unit transparent and the right-eye lens unit opaque based on an opening/closing signal transmitted from the DTV 1 so that the right eye of the user cannot see the left-eye image 21. As a result, the user sees the left-eye image 21 only with his or her left eye. In this case, the line of sight of the user who is seeing an object 22 of the left-eye image 21 is as indicated by the broken line in FIG. 2A.

FIG. 2B shows a line of sight of the user in a state that his or her right eye is seeing a right-eye image 23 (a parallax exists between the left-eye image 21 and the right-eye image 23). While the DTV 1 displays the right-eye image 23, the shutter glasses 3 render the right-eye lens unit transparent and the left-eye lens unit opaque based on an opening/closing signal transmitted from the DTV 1 so that the left eye of the user cannot see the right-eye image 23. As a result, the user sees the right-eye image 23 only with his or her right eye. In this case, the line of sight of the user who is seeing an object 24 (substantially the same as the object 22) of the right-eye image 23 is as indicated by the broken line in FIG. 2B.

FIG. 2C is a conceptual view in which the line of sight of the user who is seeing the left-eye image 21 only with his or her left eye and the line of sight of the user who is seeing the right-eye image 23 only with his or her right eye are drawn in combination. The user should make a recognition that an object existed at a crossing point of the lines of sight of his or her left eye and the right eye. Therefore, when seeing the objects 22 and 24 with his or her left eye and right eye, respectively, the user feels as if an object 25 existed at a crossing point of the lines of sight. In this manner, the user recognizes, three-dimensionally, a 3D-viewable motion picture that is displayed on a plane.

Figure 3A:
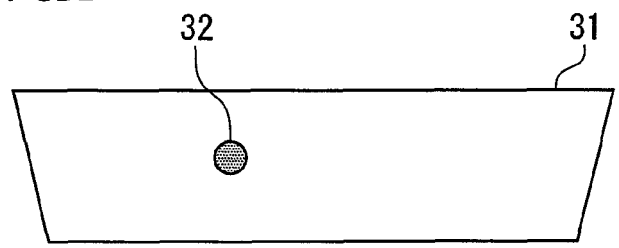
FIGS. 3A-3C are exemplary conceptual views showing a manner of viewing of the user when a 3D-viewable motion picture having a large parallax is displayed.
Figure 3B:
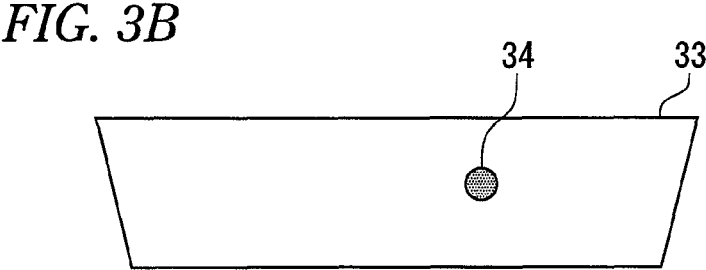
Figure 3C:
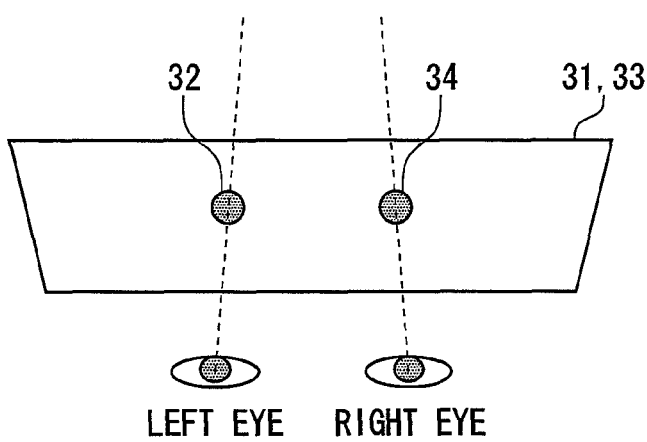

FIGS. 3A-3C are conceptual views showing an example manner of viewing of the user when a 3D-viewable motion picture having a large parallax is displayed.

FIG. 3A shows a left-eye image 31 which includes an object 32. FIG. 3B shows a right-eye image 33 which includes an object 34 (a parallax exists between the left-eye image 31 and the right-eye image 33). The parallax between the left-eye image 31 and the right-eye image 33 is larger than the one between the left-eye image 21 and the right-eye image 23.

FIG. 3C is a conceptual view in which the line of sight of the user who is seeing the left-eye image 31 only with his or her left eye and the line of sight of the user who is seeing the right-eye image 33 only with his or her right eye are drawn in combination. In the example of FIGS. 3A-3C, because of the large parallax between the left-eye image 31 and the right-eye image 33, the crossing point of the lines of sight of the user who is seeing the object 32 with his or her left eye and the right eye, respectively, is very distant from the user. In this case, the user cannot recognize the object 32 and the object 34 as a single object, that is, the user recognizes it as separate objects. The image is thus seems blurred.

As described above, when the parallax between a left-eye image and a right-eye image is too large, it is difficult for the user to recognize a motion picture three-dimensionally. This situation would be caused by various factors.

For example, this situation may occur when a motion picture is displayed on a screen that is larger than an assumed one and a user views it with a distance for viewing of an ordinary screen. In this case, since a motion picture is displayed on a screen that is larger than an assumed one, each of a left-eye image and a right-eye image is enlarged to make the parallax larger than expected. It is therefore difficult for the user to recognize it three-dimensionally.

A similar situation occurs when a viewing position of a user is closer to a display screen of a motion picture than assumed. Further, a similar situation occurs when the distance between both eyes is smaller than assumed as in the case of a child viewer.

The DTV 1 according to the embodiment can prevent the above-described situation that the parallax of a 3D-viewable motion picture becomes too large and thereby present the user with an easy-to-view 3D-viewable motion picture. This function will be described below.

Figure 4:
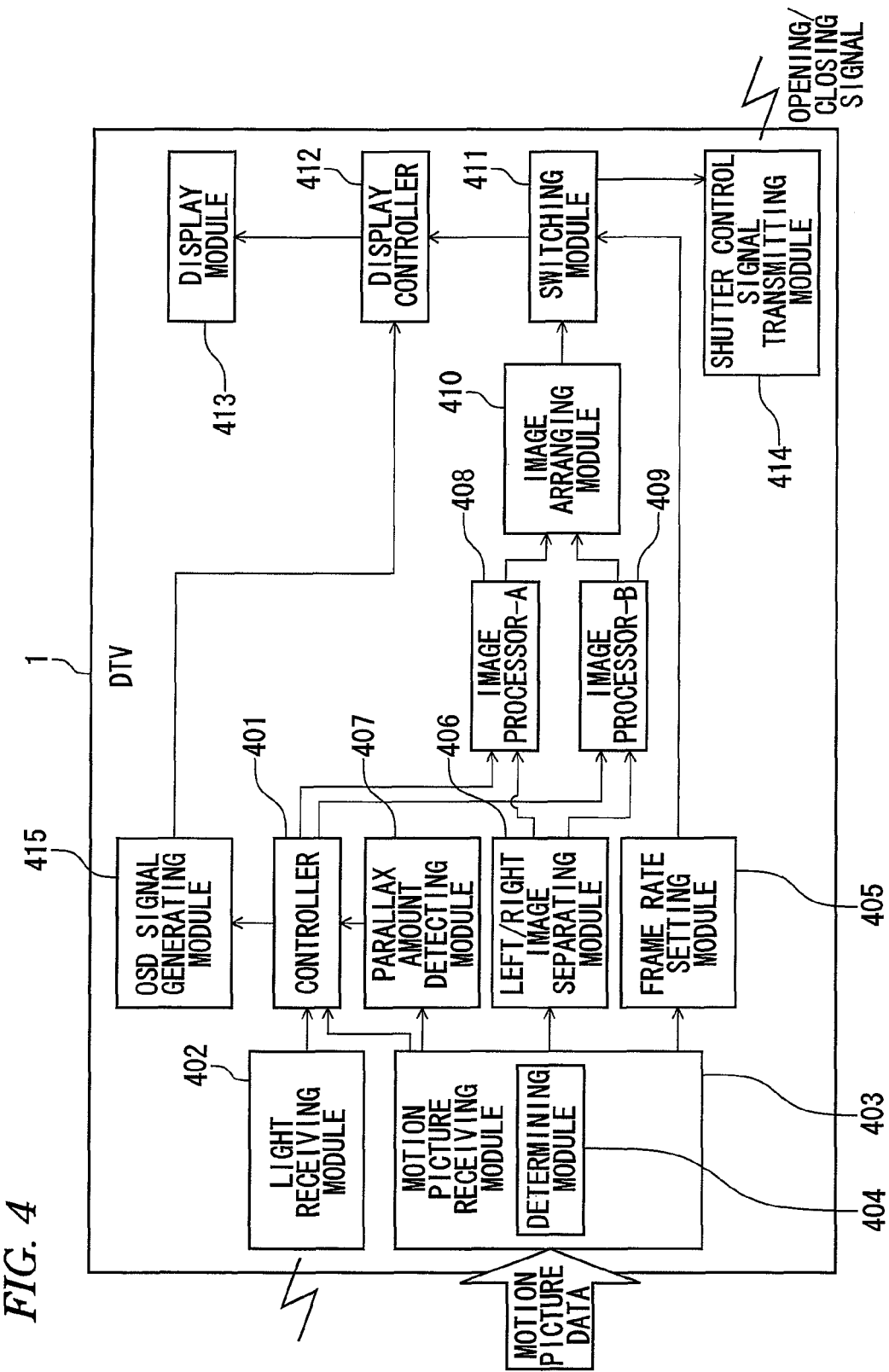
FIG. 4 is an exemplary block diagram showing an internal configuration of a DTV according to the embodiment.

FIG. 4 is a block diagram showing an example internal configuration of the DTV 1 according to the embodiment. As shown in FIG. 4, the DTV 1 is composed of a controller 401, a light receiving module 402, a motion picture receiving module 403, a frame rate setting module 405, a left/right image separating module 406, a parallax amount detecting module 407, an image processor-A 408, an image processor-B 409, an image arranging module 410, a switching module 411, a display controller 412, a display module 413, a shutter control signal transmitting module 414, and an OSD signal generating module 415. The motion picture receiving module 403 has a determining module 404.

The controller 401 includes a CPU (central processing unit) and a memory and has a function of controlling the entire DTV 1. The controller 401 supplies various instructions to the individual components of the DTV 1.

The light receiving module 402 is a receiving module such as an infrared light receiving device and has a function of receiving an infrared signal (operation signal) from a remote controller (not shown). The remote controller detects pressing of a button by the user and transmits an infrared signal corresponding to the pressed button to the DTV 1. The light receiving module 402 has a function of receiving the infrared signal and supplying the controller 401 with an electrical signal corresponding to the received infrared signal. The controller 401 performs processing corresponding to the received electrical signal. Although in the embodiment a signal is transmitted to the light receiving module 402 in the form of infrared light, the invention is not limited to such a case. Any other communication standard can be employed as long as it enables transmission and reception of a signal.

The motion picture receiving module 403 has a function of receiving motion picture data which contains a 2D motion picture or a 3D-viewable motion picture. Example motion pictures to be received by the motion picture receiving module 403 are a motion picture that is transmitted in the form of a transport stream (TS) and a motion picture that is transmitted in the form of a baseband signal. The motion picture receiving module 403 receives motion picture data containing metadata and a motion picture that is carried by broadcast waves or supplied from a recorder or the like that is connected to the DTV 1. The motion picture receiving module 403 also has a function of supplying received motion picture data to prescribed components of the DTV 1. Furthermore, the motion picture receiving module 403 has a function of decoding a received motion picture.

The determining module 404 has a function of determining whether or not a motion picture contained in motion picture data is 2D motion picture or a 3D-viewable motion picture. The determining module 404 also has a function of extracting data indicating a display screen size that is recommended for display of a motion picture contained in motion picture data. The determining module 404 determines whether a motion picture contained in received motion picture data is 2D motion picture or a 3D-viewable motion picture based on metadata contained in the motion picture data. The determining module 404 also has a function of extracting data indicating a display screen size or the like that is recommended for display of the motion picture and supplying the extracted data to the controller 401, if the metadata contains that data. The metadata may be contained in a transport stream or supplied separately from a transport stream from a recorder that is connected to the DTV 1. If the determining module 404 determines that the motion picture is a 2D motion picture, the motion picture receiving module 403 supplies decoded motion picture data to the frame rate setting module 405. If the determining module 404 determines that the motion picture is a 3D-viewable motion picture, the motion picture receiving module 403 supplies decoded motion picture data to the left/right image separating module 406 and the parallax amount detecting module 407. However, if the metadata contains data indicating a display screen size or the like that is recommended for display of the motion picture (a case mentioned above), the motion picture receiving module 403 does not supply motion picture data to the parallax amount detecting module 407. Although in the embodiment the determining module 404 determines whether motion picture data contains a 2D motion picture or a 3D-viewable motion picture by referring to the metadata of the motion picture data, the invention is not limited to such a case. For example, the determining module 404 may detect whether or not the motion picture has a prescribed format for transmission of a 3D-viewable motion picture based on a decoded motion picture signal and make that determination based on a result of that detection. For example, in the case of side-by-side 3D-viewable motion picture transfer in which a left-eye image and a right-eye image each having a low resolution are transferred being arranged in the horizontal direction in a single image, the determining module 404 may detect whether or not an image correlation exists between the left half and the right half of a single image and determine whether the motion picture data contains a 2D motion picture or a 3D-viewable motion picture based on a result of that detection.

The frame rate setting module 405 has a function of setting, according to the specification of the display module 413 of the DTV 1 and other factors, a frame rate to be employed in displaying a 2D motion picture received from the motion picture receiving module 403 on the display module 413. The frame rate setting module 405 supplies the frame-rate-set 2D motion picture and the frame rate information to the switching module 411.

The left/right image separating module 406 has a function of separating a 3D-viewable motion picture into left-eye images and right-eye images when receiving it from the motion picture receiving module 403. The left/right image separating module 406 supplies the separated left-eye images and right-eye images to the image processor-A 408 and the image processor-B 409, respectively.

The parallax amount detecting module 407 has a function of detecting a parallax between left-eye images and right-eye images contained in a 3D-viewable motion picture when receiving it from the motion picture receiving module 403. The parallax amount detecting module 407 supplies information of the detected parallax amount to the controller 401.

The controller 401 supplies instructions relating to image expansion processing to the image processor-A 408 and the image processor-B 409 based on motion picture recommended display screen size information received from the motion picture receiving module 403, motion picture parallax information detected by the parallax amount detecting module 407, or user remote controller operation information received from the light receiving module 402. That is, the controller 401 instructs the image processor-A 408 and the image processor-B 409 whether to perform image expansion processing etc. and by what amount to expand the image (if image expansion processing etc. should be performed).

When receiving motion picture recommended display screen size information from the motion picture receiving module 403, the controller 401 instructs the image processor-A 408 and the image processor-B 409 to perform image expansion processing if the recommended display screen size is smaller than a given value. If image expansion processing should be performed, the controller 401 sets an expansion processing amount according to the recommended display screen size. That is, the controller 401 sets a larger expansion processing amount when the recommended display screen size is smaller. The given value which is compared with a recommended display screen size and hence serves as a reference of a determination as to whether to give image expansion processing instructions is determined by a display screen size of the display module 413 of the DTV 1. The given value is stored in a memory that is provided in the controller 401.

When receiving parallax information of a 3D-viewable motion picture from the parallax amount detecting module 407, the controller 401 instructs the image processor-A 408 and the image processor-B 409 to perform image expansion processing etc. if the received parallax information is larger than a given value. If image expansion processing should be performed, the controller 401 sets an expansion processing amount according to the received parallax value. That is, the controller 401 sets a larger expansion processing amount when the parallax value is larger. The given value which is compared with a parallax value is also determined by the display screen size of the display module 413 of the DTV 1. The given value is stored in the memory which is provided in the controller 401.

The controller 401 also instructs the image processor-A 408 and the image processor-B 409 about image expansion processing based on user remote controller operation information. This will be described later with reference to FIG. 7.

The image processor-A 408 and the image processor-B 409 can perform image expansion processing etc. on a left-eye image and a right-eye image, respectively, that are received from the left/right image separating module 406. The image expansion processing etc. which are performed by the image processor-A 408 and the image processor-B 409 will be described later with reference to FIGS. 5A-5C. After performing image expansion processing, each of the image processor-A 408 and the image processor-B 409 cuts out part of an expanded image and supplies the cut-out image to the image arranging module 410. Whereas the image processor-A 408 and the image processor-B 409 perform image expansion processing etc. according to instructions from the controller 401, the image processor-A 408 and the image processor-B 409 do not perform image expansion processing or cutting-out processing and supply received images to the image arranging module 410 if they are instructed not to perform image expansion processing or receive no instructions from the controller 401.

The image arranging module 410 has a function of arranging received left-eye images and right-eye images and outputting resulting images. More specifically, the image arranging module 410 arranges received left-eye images and right-eye images alternately, sets a frame rate at which a 3D-viewable motion picture containing the left-eye images and the right-eye images is to be displayed, and outputting the arranged images to the switching module 411. How the image arranging module 410 arranges left-eye images and right-eye images will be described later with reference to FIG. 6.

The switching module 411 has a function of output module configured to selectively output motion picture signals received from the frame rate setting module 405 and the image arranging module 410, respectively. The switching module 411 outputs a 2D motion picture or a 3D-viewable motion picture to the display controller 412 at a set frame rate. In outputting a 3D-viewable motion picture, the switching module 411 instructs the shutter control signal transmitting module 414 about an opening/closing signal according to the frame rate of the 3D-viewable motion picture.

The display controller 412 has a function of controlling the display module 413. That is, the display controller 412 has a function of displaying a motion picture on the display module 413 based on a signal of the motion picture received from the switching module 411.

In the embodiment, the display module 413 is a liquid crystal display (LCD), for example, and has a function of displaying a motion picture on its own display screen 2. The display module 413 is not limited to an LCD and may be any of other various display devices such as a plasma display panel (PDP) and an organic electroluminescence (EL) device.

The shutter control signal transmitting module 414 transmits an opening/closing signal to the shutter glasses 3 according to an instruction from the switching module 411. An opening/closing signal may be transmitted by an infrared communication or according to another communication standard.

The OSD signal generating module 415 generates an OSD (on-screen display) signal for display of a UI (user interface) picture or the like under the control of the controller 401, and supplies the generated OSD signal to the display controller 412. The display controller 412 displays the UI picture based on the OSD signal so as to be superimposed on a motion picture.

In the embodiment, the image processor-A 408 for performing image edit processing on left-eye images and the image processor-B 409 for performing image edit processing on right-eye images are provided as two image processing modules for performing image expansion processing etc. This makes it possible to perform image expansion processing etc. on left-eye images and right-eye images in parallel and hence can make the image processing speed higher than in a case of performing such image processing with a single module.

In the embodiment, the image processor-A 408 and the image processor-B 409 perform image expansion processing etc. on left-eye images and right-eye images, respectively, according to an instruction from the controller 401. This processing will be described below in detail.

Figure 5A:
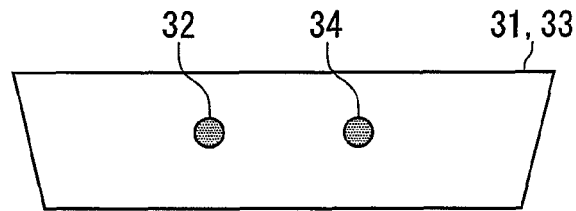
FIGS. 5A-5C are exemplary conceptual views showing a method of image expansion processing etc. which are performed on a 3D-viewable motion picture in the embodiment.
Figure 5B:
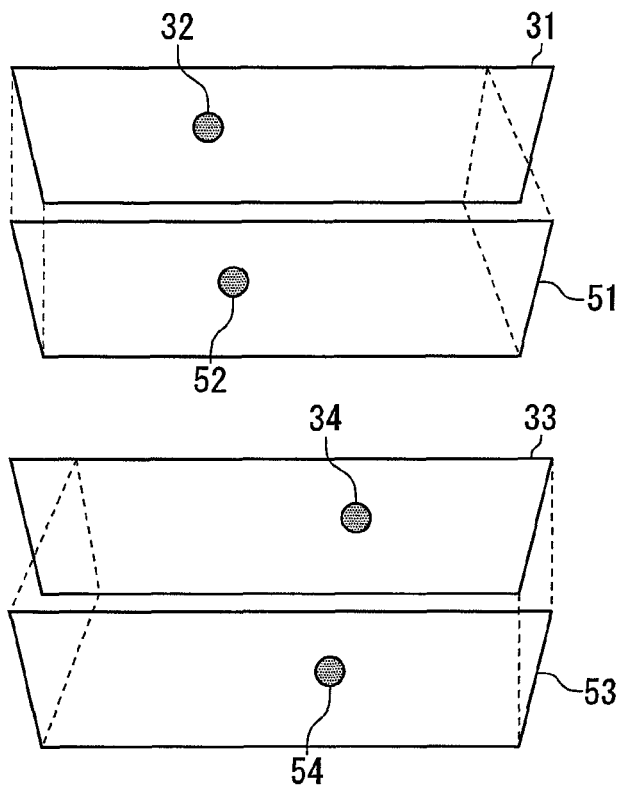
Figure 5C:
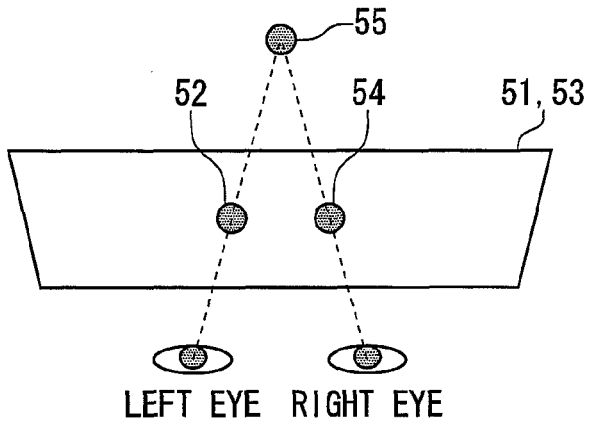

FIGS. 5A-5C are conceptual views showing an example method of the image expansion processing etc. which are performed on a 3D-viewable motion picture in the embodiment.

FIG. 5A is a conceptual view showing an image obtained by combining a left-eye image 31 and a right-eye image 33 that are input to the image processor-A 408 and the image processor-B 409. As described above with reference to FIGS. 3A-3C, the left-eye image 31 and the right-eye image 33 have so large a parallax that it is difficult for the user to recognize the image three-dimensionally.

FIG. 5B is a conceptual view illustrating the image expansion processing etc. which are performed by the image processor-A 408 and the image processor-B 409.

The image processor-A 408 performs processing of expanding the input left-eye image 31 in the horizontal direction and cuts out a partial region of an expanded image. The cut-out region is a region that has the same size as the input left-eye image 31 and does not include the pixels of a right end portion of the expanded image. In the embodiment, a description will be made of an example in which the cut-out region includes pixels in the vicinity of the left end of the expanded image (e.g., one of the first to 10th pixels from the left end). A left-eye image 51 is generated by these pieces of processing. An object 52 of the left-eye image 51 is deviated to the right side from the object 32 of the left-eye image 31.

The image processor-B 409 performs processing of expanding the input right-eye image 32 in the horizontal direction and cuts out a partial region of an expanded image. The cut-out region is a region that has the same size as the input right-eye image 33 and does not include the pixels of a left end portion of the expanded image. In the embodiment, a description will be made of an example in which the cut-out region includes pixels in the vicinity of the right end of the expanded image (e.g., one of the first to 10th pixels from the right end). A right-eye image 53 is generated by these pieces of processing. An object 54 of the right-eye image 53 is deviated to the left side from the object 34 of the right-eye image 33.

FIG. 5C is a conceptual view in which the line of sight of the user who is seeing the left-eye image 51 only with his or her left eye and the line of sight of the user who is seeing the right-eye image 53 only with his or her right eye are drawn in combination.

In the left-eye image 51 and the right-eye image 53 generated by the image processor-A 408 and the image processor-B 409 by performing the above-described image expansion processing and cutting-out processing on the left-eye image 31 and the right-eye image 33, the distance between the objects 52 and 54 are shorter than the distance between the objects 32 and 34, which means that the parallax between the left-eye image 51 and the right-eye image 53 is smaller than that between the left-eye image 31 and the right-eye image 33. Therefore, a crossing point of the lines of sight of both eyes of the user is formed and the user can recognize an object 55 three-dimensionally.

In the embodiment, a region, including a portion close to its left end, of an expanded image of the left-eye image 31 and a region, including a portion close to its right end, of an expanded image of the right-eye image 33 are cut out and output as the left-eye image 51 and the right-eye image 53, respectively. This makes it possible to accommodate a case that the left-eye image 31 and the right-eye image 33 have a large parallax.

Although the embodiment is directed to the case of expanding images in the horizontal direction, the invention is not limited to such a case. For example, images may be expanded without charging their aspect ratio. Also in this case, a region including portions close to the ends of an expanded image and having the same size as a pre-expansion image is cut out and output. That is, the expansion direction is not limited to the horizontal direction and images may also be expanded in the vertical direction.

Although, in the embodiment, to simplify the description, what the user should recognize three-dimensionally is expressed as the object 52 or the like, naturally the user can also recognize, three-dimensionally, other things of the left-eye image 51 and the right-eye image 53.

Although the above description is such that the each of the image processor-A 408 and the image processor-B 409 performs image expansion processing and cutting-out processing in this order, the invention is not limited to such a case. Image expansion processing may be performed after cutting-out processing.

The embodiment does not cause any unnatural portions locally in a resulting image because an original image is expanded in its entirety rather than locally.

Although in the embodiment an original image is expanded in its entirety, in the embodiment an original image may be expanded locally, for example.

In the DTV 1 according to the embodiment, an original image is expanded by image expansion processing so as to be increased in size instead of cutting out and display only part of the original image. This prevents a phenomenon that an undisplayed region occurs at an end portion, for example, of the display screen 2 unlike in the case that only part of an original image is cut out and displayed.

Next, an example of the processing of arranging left-eye images and right-eye images which is performed by the image arranging module 410 will be described.

Figure 6:
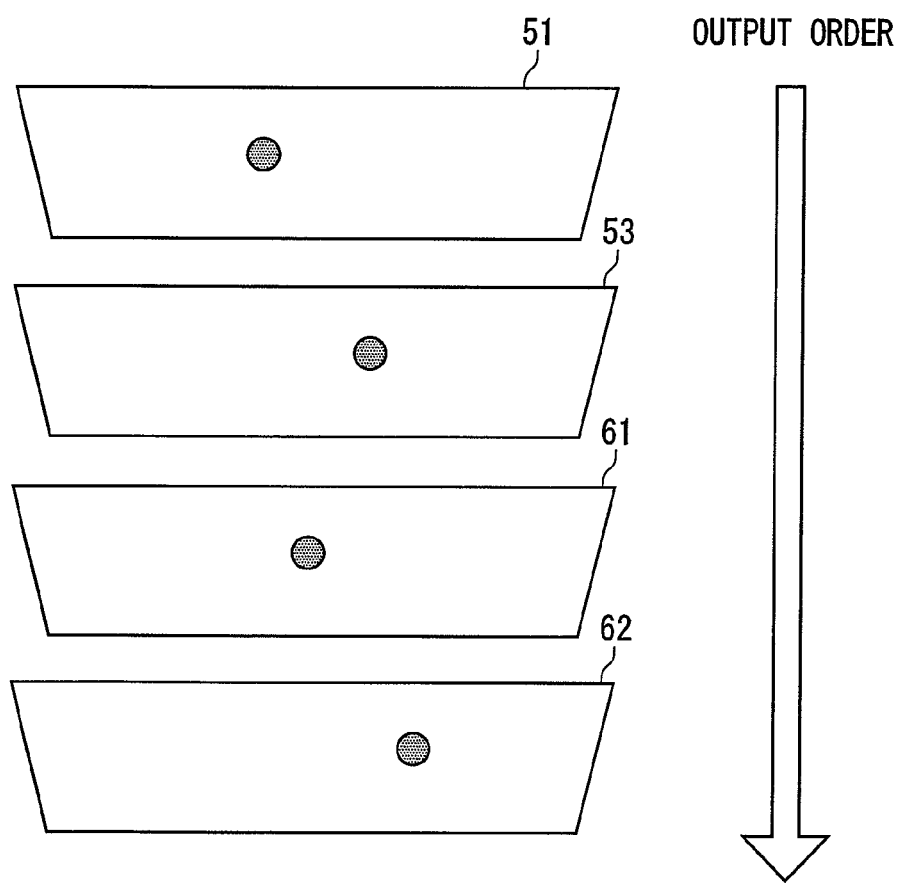
FIG. 6 is an exemplary conceptual view showing a processing of arranging left-eye images and right-eye images which is performed by an image arranging module.

FIG. 6 is a conceptual view showing an example of the processing of arranging left-eye images and right-eye images which is performed by the image arranging module 410.

The image arranging module 410 outputs left-eye images and right-eye images received from the image processor-A 408 and the image processor-B 409 in such a manner that they are arranged alternately in time series. In FIG. 6, it is assumed that a left-eye image 61 is an image that should be output after a left-eye image 51 and a right-eye image 62 is an image that should be output after a right-eye image 53.

In this case, the image arranging module 410 outputs the left-eye image 51, the right-eye image 53, the left-eye image 61, and the right-eye image 62 in this order.

The DTV 1 according to the embodiment displays a UI picture based on an OSD signal that is generated by the OSD signal generating module 415. How this display is performed will be described below.

Figure 7:
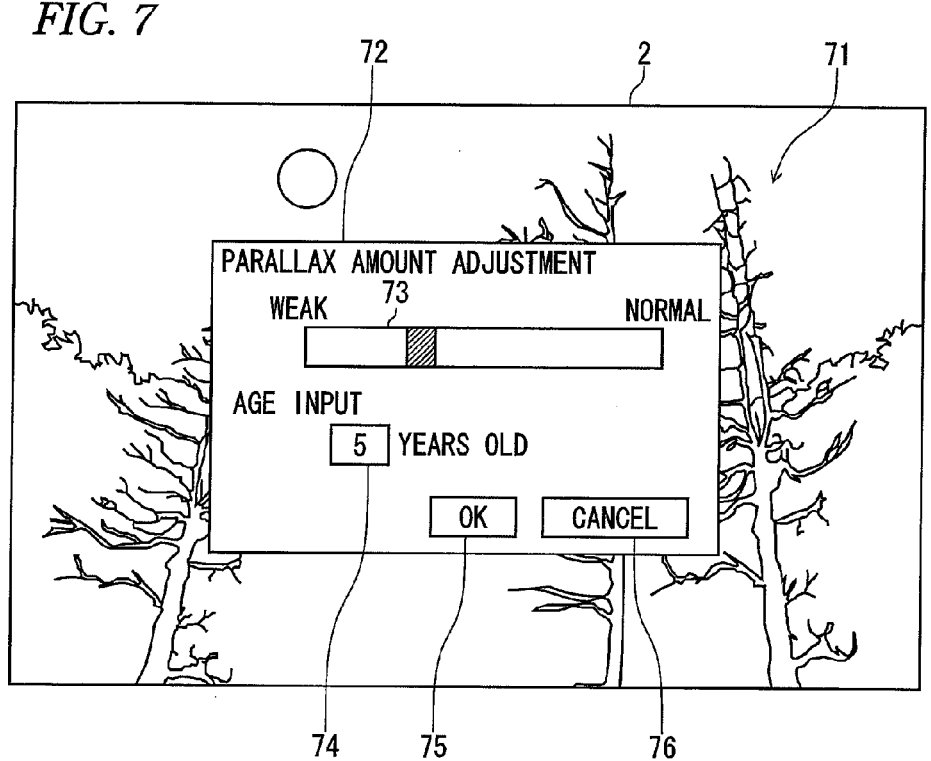
FIG. 7 an exemplary conceptual view showing an UI picture displayed on a display screen of the DTV in the embodiment.

FIG. 7 schematically shows an example UI picture displayed on the display screen 2 of the DTV 1 in the embodiment. As shown in FIG. 7, a parallax amount adjustment picture 72 including a parallax amount adjusting slider 73, an age input box 74, an OK button 75, and a cancel button 76 is displayed on the display screen 2 so as to be superimposed on a display image 71.

The display image 71 which is one image of a 3D-viewable motion picture is displayed on the display screen 2 of the DTV 1, and the parallax amount adjustment picture 72 is superimposed on the display image 71. The parallax amount adjustment picture 72 is displayed according to an OSD signal which is generated by the OSD signal generating module 415, and the user can adjust the parallax amount between sequential images of the 3D-viewable motion picture using the parallax amount adjustment picture 72.

In the parallax amount adjusting slider 73, a slider (hatched in FIG. 7) is moved according to an operation that is performed by the user on a leftward/rightward key of the remote controller. The parallax amount between the images of the 3D-viewable motion picture is controlled according to the position of the slider. When the position of the slider is fixed, the motion picture comes to be displayed with a parallax amount corresponding to the slider position. More specifically, when the user operates the remote controller, a signal corresponding to the operation is input to the controller 401. Based on the received signal, the controller 401 instructs the image processor-A 408 and the image processor-B 409 to perform image expansion processing and gives them an expansion processing amount. Based on those instructions, the image processor-A 408 and the image processor-B 409 expand images and cut out regions of the images in the above-described manners. Resulting images are displayed on the display screen 2.

The age input box 74 is a box into which the user can input the age of a viewer. The user can input a number into the age input box 74 using numeral keys (channel keys) etc. of the remote controller. The controller 401 has, in its own memory, a table which correlates user ages with respective expansion processing amounts to be given to the image processor-A 408 and the image processor-B 409 in instructing them to perform image expansion processing. When the age of a viewer is input to the age input box 74, the controller 74 determines an expansion processing amount by referring to the table and instructs the image processor-A 408 and the image processor-B 409 to perform image expansion processing and gives them the thus-determined expansion processing amount. When the interval between the eyes of a viewer is small because, for example, the viewer is a child, the parallax between images of a displayed 3D-viewable motion picture is too large for the interval between the eyes of the viewer and hence it is difficult for the viewer to recognize it three-dimensionally. Therefore, when the interval between the eyes of a viewer is small, it is better to decrease the parallax of a 3D-viewable motion picture. The DTV 1 performs image expansion processing so as to decrease the parallax between left-eye images and right-eye images of a 3D-viewable motion picture according to an input age of a viewer.

The OK button 75 is a button which is operated by the user to decide on a set parallax amount. When the OK button 75 is operated by the user, the parallax amount adjustment picture 72 disappears with the adjusted parallax amount kept effective. The cancel button 76 is a button which is operated by the user to cancel a set parallax amount. If the OK button 75 or the cancel button 76 is operated by the user, the OSD signal generating module 415 stops the generation and output of the OSD signal to finish the display of the parallax amount adjustment picture 72.

Next, a parallax amount adjustment processing which is executed by the DTV 1 will be described.

Figure 8:
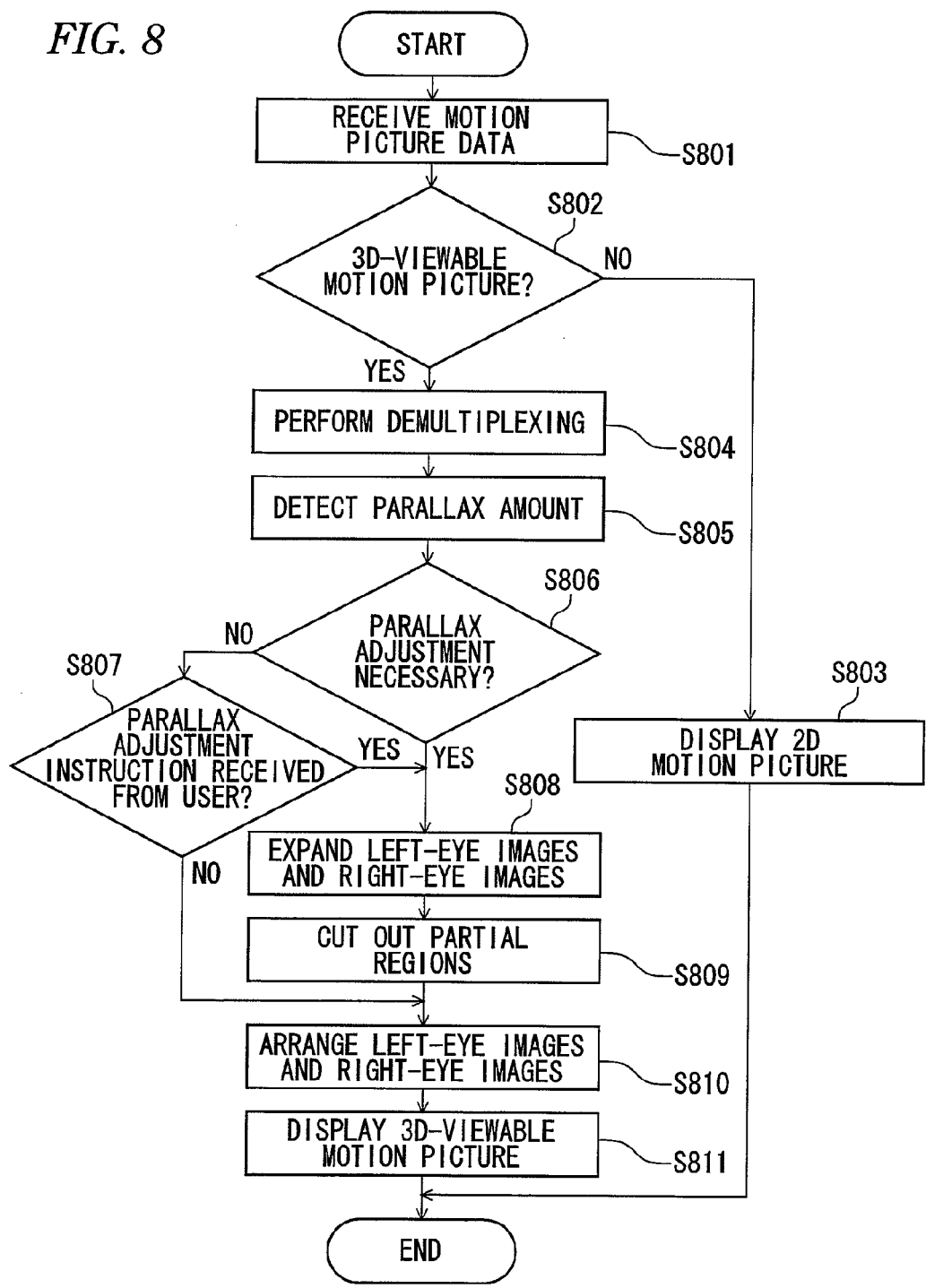
FIG. 8 is an exemplary flowchart showing a parallax amount adjustment processing which is executed by the DTV according to the embodiment.

FIG. 8 is a flowchart of an example parallax amount adjustment processing which is executed by the DTV 1 according to the embodiment.

First, at step S801, the DTV 1 receives motion picture data with the motion picture receiving module 403.

At step S802, the motion picture receiving module 403 decodes the motion picture data and the determining module 404 reads metadata of the motion picture data and determines whether or not a motion picture contained in the motion picture data is a 3D-viewable motion picture. The image type determining method is not limited to the above one. As described above, the determining module 404 may determine whether or not a motion picture contained in the motion picture data is a 3D-viewable motion picture based on an image signal contained in the motion picture data.

If the determining module 404 determines that the motion picture is not a 3D-viewable motion picture, that is, the motion picture is a 2D motion picture (S802: no), the motion picture receiving module 403 outputs the motion picture data to the frame rate setting module 405. The frame rate setting module 405 sets a frame rate for the received motion picture and outputs the motion picture data and the frame rate information to the switching module 411. Receiving the motion picture data and the frame rate information, the switching module 411 outputs a motion picture to the display controller 412 according to the set frame rate. The display controller 412 displays the motion picture on the display module 413 (step S803).

If determining that the motion picture is a 3D-viewable motion picture (S802: yes), the determining module 404 detects, from the metadata, whether or not the metadata contains information of a recommended display screen size to be used in displaying the motion picture. If recommended display screen size information exists, the motion picture receiving module 403 supplies it to the controller 401. Furthermore, the motion picture receiving module 403 outputs the motion picture data to the left/right image separating module 406 and the parallax amount detecting module 407 (if the motion picture data contains recommended display screen size information, the motion picture receiving module 403 does not output the motion picture data to the parallax amount detecting module 407). Receiving the motion picture data, at step S804 the left/right image separating module 406 separates the 3D-viewable motion picture contained in the motion picture data into left-eye images and right-eye images and outputs them to the image processor-A 408 and the image processor-B 409, respectively.

At step S805, the parallax amount detecting module 407 compares a left-eye image and a right-eye image of the received motion picture and detects a parallax amount between those images. The parallax amount detecting module 407 outputs information of the detected parallax amount to the controller 401.

At step S806, the controller 401 receives the recommended display screen size information or the parallax amount information and determines, based on the received information, whether to perform a parallax adjustment.

If the recommended display screen size is larger than a given value or the parallax amount is smaller than a given value, the controller 401 determines that it is not necessary to perform a parallax adjustment (S806: no). If the recommended display screen size is smaller than the given value or the parallax amount is larger than the given value, the controller 401 determines that it is necessary to perform a parallax adjustment (S806: yes).

If determining that a parallax adjustment is not necessary (S806: no), the controller 401 determines at step S807 whether or not a parallax adjustment instruction has been received from the user. A parallax amount adjustment picture 72 is displayed by the DTV 1 in response to a prescribed operation made by the user on the remote controller. If a parallax adjustment instruction has been received from the user through the parallax amount adjustment picture 72 (S807: yes), the controller 401 performs a parallax adjustment of an adjustment amount indicated by the parallax adjustment instruction.

If determining that a parallax adjustment is necessary at step S806 or S807 (S806 or S807: yes), the controller 401 instructs the image processor-A 408 and the image processor-B 409 to perform image expansion processing and gives them an image expansion amount. Based on these instructions, at step S808 the image processor-A 408 and the image processor-B 409 perform image expansion processing on the left-eye images and the right-eye images, respectively.

At step S809, the image processor-A 408 and the image processor-B 409 cut out partial regions of expanded images. The image processor-A 408 and the image processor-B 409 output the cut-out images to the image arranging module 410.

If determining that no parallax adjustment instruction has been received from the user (S807: no), the controller 401 instructs the image processor-A 408 and the image processor-B 409 not perform image expansion processing. Receiving that instruction, the image processor-A 408 and the image processor-B 409 do not process the left-eye images and the right-eye images and output them to the image arranging module 410.

Receiving the images from the image processor-A 408 and the image processor-B 409, at step S810 the image arranging module 410 arranges the left-eye images and the right-eye images alternately in times series and sets a frame rate for a 3D-viewable motion picture. The image arranging module 410 outputs arranged images and information of the frame rate to the switching module 411.

Receiving the arranged images (3D-viewable motion picture) and the frame rate information, the switching module outputs the images to the display controller 412 according to the received frame rate. Receiving the images, at step S811 the display controller 412 causes the display module 413 to display a 3D-viewable motion picture.

The process is finished upon execution of step S803 or S811.

In the embodiment, a 3D motion picture is presented to the user by the frame-sequential method using the shutter glasses 3 and hence left-eye images and right-eye images are output alternately. However, the invention is not limited to such a case. A 3D motion picture may be presented to the user by other 3D motion picture presenting methods. For example, a 3D motion picture presenting method may be employed in which each frame contains a left-eye image and a right-eye image in mixture and the left-eye image and the right-eye image are caused to be seen by the left eye and the right eye, respectively, of the user by utilizing polarization of light. In this case, the DTV 1 simultaneously outputs a left-eye image and a right-eye image as one frame.

In the embodiment, the DTV 1 detects a parallax between left-eye images and right-eye images of a 3D-viewable motion picture and determines whether to perform image expansion processing according to the detected parallax. Therefore, the DTV 1 can automatically adjust the parallax amount if the parallax of the 3D-viewable motion picture is too large.

In the embodiment, the DTV 1 performs image expansion processing according to according to a recommended display screen size for display of a 3D-viewable motion picture. As such, the DTV 1 can automatically adjust the parallax amount according to a characteristic of a 3D-viewable motion picture.

Controlling the expansion processing amount according to a parallax amount of a 3D-viewable motion picture or a recommended display screen size for display of a 3D-viewable motion picture, the DTV 1 can automatically control the parallax adjustment amount.

In the embodiment, since the DTV 1 is equipped with the interface that allows the user to set a parallax amount, the user can set a parallax amount to a desired value. Furthermore, the DTV 1 displays a picture for parallax adjustment, the user can recognize a parallax adjustment amount intuitively.

Although in the embodiment image expansion processing is performed to decrease the parallax between left-eye images and right-eye images if it is too large, the invention is not limited to such a case. Image expansion processing may be performed when the parallax between left-eye images and right-eye images is too small. In this case, after performing image expansion processing, the image processor-A 408 and the image processor-B 409 cut out a right-hand region, having the same size as an original left-eye image, of an expanded left-eye image and a left-hand region, having the same size as an original right-eye image, of an expanded right-eye image, respectively, and output the cut-out images. With these pieces of processing, the parallax between the left-eye images and the right-eye images are increased. As such, the DTV 1 can adjust the too small parallax amount and thereby provide a 3D-viewable motion picture that is more suitable for viewing by the user. In this case, a phenomenon that a region where no image is displayed occurs on the display screen 2 can be prevented.

The DTV 1 according to the embodiment allows the user to properly view a 3D-viewable motion picture while preventing the phenomenon that a region where no image is displayed occurs on the display screen 2 of the display module 413.

(Second embodiment)

A second embodiment will be hereinafter described.

Figure 9:
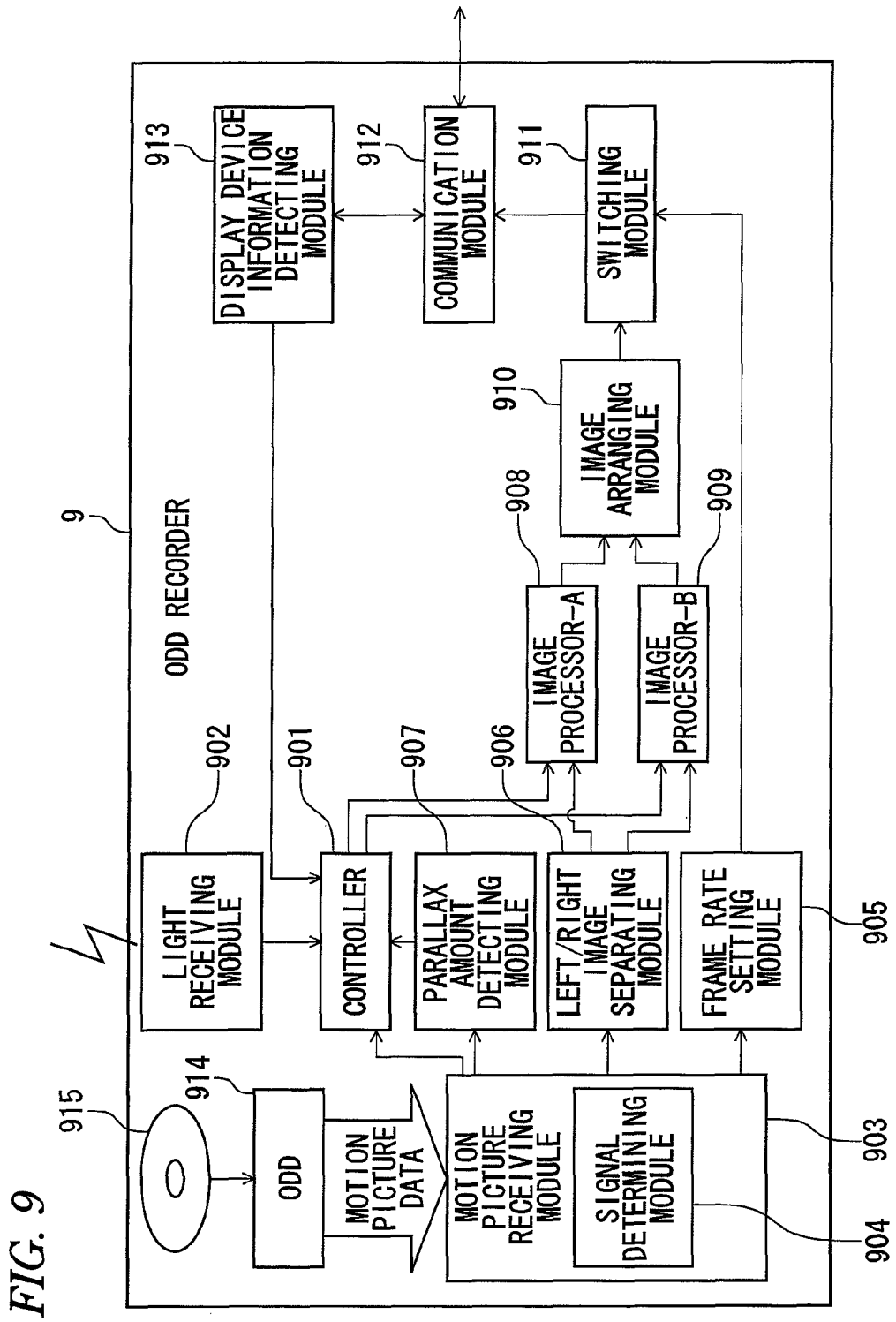
FIG. 9 is an exemplary block diagram showing an internal configuration of an ODD recorder according to a second embodiment.

FIG. 9 is a block diagram showing an example internal configuration of an ODD (optical disc drive) recorder 9 according to the second embodiment. As shown in FIG. 9, the ODD recorder 9 is composed of a controller 901, a light receiving module 902, a motion picture receiving module 903, a frame rate setting module 905, a left/right image separating module 906, a parallax amount detecting module 907, an image processor-A 908, an image processor-B 909, an image arranging module 910, a switching module 911, a communication module 912, a display device information detecting module 913, and an ODD 914. The motion picture receiving module 903 has a signal determining module 904. Reference numeral 915 denotes an optical disc.

In the internal configuration of the ODD recorder 9 according to the embodiment, it is assumed that components having same-name components in the first embodiment basically have approximately the same functions as the latter. In the following, components that were not described in the first embodiment and components that have same-name components in the first embodiment but have different functions as the latter will mainly be described.

The ODD recorder 9 is a recorder which can store a motion picture in the optical disc 915 inserted therein and play back the motion picture stored in the optical disc 915. Examples of the optical disc 915 are a DVD (digital versatile disc) and a BD (Blu-ray (registered trademark) disc).

The communication module 912 is a communication module that complies with the HDMI (high-definition multimedia interface) standard, for example, and has a function of communicating with a display device such as a digital TV receiver (DTV) connected to it via an HDMI cable. In the embodiment, the communication module 912 communicates with a DTV (external apparatus) and thereby exchanges various data with it.

The display device information detecting module 913 instructs, via the communication module 912, the display device (in the embodiment, DTV) connected to the communication module 912 to transmit size information of its display screen. The display device information detecting module 913 has a function of supplying display screen size information to the controller 901 when receiving it from the DTV via the communication module 912.

In the first embodiment, the memory of the controller 401 is stored with size information of the display screen 2 of the DTV 1 and determines whether to perform image expansion processing and determines an expansion processing amount based on the stored size information and recommended screen size information or parallax information of a motion picture. In contrast, in the second embodiment, the controller 901 receives, from the display device information detecting module 913, size information of the display screen of the DTV connected to the ODD recorder 9 and determines whether to perform image expansion processing and determines an expansion processing amount based on the received size information and recommended screen size information or parallax information of a motion picture. The controller 901 may store the received display screen size information of the DTV in a memory.

The ODD 914 is an optical disc drive having a function of writing and reading data to and from the optical disc 915. The ODD also has a function of outputting, to the motion picture receiving module 903, motion picture data that is read from the optical disc 915.

Although the embodiment is directed to the ODD recorder 9 which is an example electronic apparatus, the invention is not limited to such a case. Other example electronic apparatus are recorders such as an HDD (hard disk drive) recorder.

The ODD recorder 9 according to the embodiment can receive information of an externally connected display device and perform a parallax amount adjustment according to the received information.

While certain embodiments have been described, these embodiments have been presented by way of example only, and are not intended to limit the scope of the invention. Indeed, the novel apparatus and method described herein may be embodied in a variety of other forms; furthermore, various omissions, substitutions and changes in the form of the apparatus and the method described herein may be made without departing from the sprit of the invention. The accompanying claims and their equivalents are intended to cover such forms or modifications as would fall within the scope and sprit of the invention.

What is claimed is:

1. An electronic apparatus comprising:
a receiver configured to receive a motion picture comprising a first image and a second image, wherein a parallax exists between the first image and the second image; and
an image processor configured to expand the first image and the second image at least in one direction to generate a third image and a fourth image,
wherein the image processor is configured to output data of a fifth image corresponding to a first region of the third image and a sixth image corresponding to a second region of the fourth image,
wherein the first region is configured to be the same size as the first image and does not include a first end portion of the third image;
the second region is configured to be the same-size as the second image and does not include a second end portion of the fourth image; and
the first end portion and the second end portion are located on opposite sides of the motion picture.

2. The apparatus of claim 1, wherein the image processor is configured to output sequentially or simultaneously the data of the fifth image and the fourth image.

3. The apparatus of claim 1 further comprising:
a digital detector configured to detect the parallax between the first image and the second image,
wherein the image processor is configured to set a larger expansion amount of the first image and the second image as the detected parallax becomes larger.

4. The apparatus of claim 1 further comprising:
a digital detector configured to detect the parallax between the first image and the second image,
wherein the image processor does not expand the first image and the second image if the detected parallax is smaller than a first value, and expands the first image and the second image if the detected parallax is larger than or equal to the first value.

5. The apparatus of claim 1 further comprising:
an information receiver configured to receive information of a recommended display size for display of the motion picture,
wherein the image processor does not expand the first image and the second image if the size is larger than a first value, and expands the first image and the second image if the size is smaller than or equal to the first value.

6. The apparatus of claim 1 further comprising:
a signal receiver configured to receive a signal indicative of a change of an expansion amount,
wherein the image processor is configured to change the expansion amount according to the signal.

7. The apparatus of claim 6 further comprising:
a digital image generator configured to generate a display picture for the change of the expansion amount; and
a display controller configured to output the display picture.

8. The apparatus of claim 1 further comprising:
a display configured to receive the data of the fifth image and the sixth image from the image processor, and to display the fifth image and the sixth image based on the data.

9. The apparatus of claim 8,
wherein the display is configured to display sequentially or simultaneously the data of the fifth image and the sixth image.

10. The apparatus of claim 1,
wherein the receiver is configured to receive the motion picture that is carried by broadcast waves.

11. The apparatus of claim 1,
wherein the receiver is configured to receive the motion picture from a storage medium.

12. An image output method comprising:
receiving a motion picture comprising a first image and a second image, wherein a parallax exists between the first image and the second image;
expanding the first image and the second image at least in one direction to generate an a third image and an a fourth image; and
outputting data of a fifth image corresponding to a first region of the third image and a sixth image corresponding to a second region of the fourth image,
wherein the first region is configured to be the same size as the first image and does not include a first end portion of the third image;
the second region is configured to be the same size as the second image and doest not include a second end portion of the fourth image; and
the first end portion and the second end portion are located on opposite sides in the motion picture.

13. The method of claim 12, wherein the data of the fifth image and the sixth image are output sequentially or simultaneously.

14. The method of claim 12, further comprising:
detecting the parallax between the first image and the second image,
wherein expanding the first image and the second image comprises setting a larger expansion amount of the first image and the second image as the detected parallax becomes larger.

15. The method of claim 12, further comprising:
detecting the parallax between the first image and the second image,
wherein the first image and the second image are not expanded if the detected parallax is smaller than a first value, and the first image and the second image are expanded if the detected parallax is larger than or equal to the first value.

16. The method of claim 12, further comprising:
receiving information of a recommended display size for display of the motion picture,
wherein the first image and the second image are not expanded if the recommended display size is larger than a first value, and the first image and the second image are expanded if the size is smaller than or equal to the first value.

17. The method of claim 12, further comprising:
receiving a signal indicative of a change instruction of an expansion amount,
wherein the expansion amount is changed according to the signal indicative of a change instruction.

18. The method of claim 17, further comprising:
generating a display picture for the change of the expansion amount; and
outputting the display picture.

19. The method of claim 12, further comprising:
receiving the data of the fifth image and the sixth image, and
displaying the fifth image and the sixth image based on the data.

20. The method of claim 19,
wherein displaying the fifth image and the sixth image comprises displaying the fifth image and the sixth image sequentially or simultaneously.

* * * * *